2,874,161

ALPHA,ALPHA DIARYL PIPERIDINO ETHANOLS

Marcus G. Van Campen, Jr., Wyoming, and Charles H. Tilford, Cincinnati, Ohio, assignors to The Wm. S. Merrell Company, Cincinnati, Ohio, a corporation of Delaware No Drawing. Application March 7, 1952
Serial No. 275,470

2 Claims. (Cl. 260—294.7)

This invention relates to a new group of chemicals which are useful as diuretics. The compounds are active on oral administration, cause the urinary elimination of significant amounts of water and sodium, are free from the irritation to the gastric mucosa characteristic of the orally active diuretics presently available, and have a relatively low toxicity. The new compounds may be represented by the formula

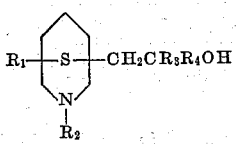

in which $R_1$ is hydrogen or methyl, $R_2$ is an alkyl group having 1 to 3 carbon atoms, $R_3$ is phenyl, lower alkoxyphenyl, lower alkylphenyl or halophenyl, and $R_4$ is phenyl, lower alkoxyphenyl, lower alkylphenyl or halophenyl. These compounds may be prepared as free bases or as acid addition salts, and will ordinarily be used in the form of acid addition salts, such as the hydrochloride, hydrobromide, or salt with other acid.

Many of the compounds are conveniently prepared by quaternizing the corresponding pyridinium derivative of the formula

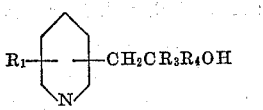

followed by catalytic reduction or by reducing the pyridinium compound to the piperidine compound and then quaternizing. Others are more conveniently prepared by reaction of the corresponding phenacyl 1-alkyl-piperidine with a Grignard reagent, e. g.,

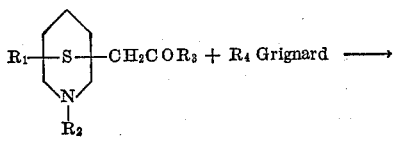

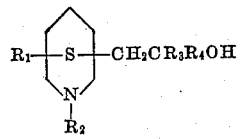

Preparation of the compounds will be illustrated by the following specific examples, but the invention is not limited thereto.

EXAMPLE I

*Alpha,alpha-diphenyl-beta-[2-(1-methylpiperidine)] ethanol*

To a Grignard solution prepared in the conventional method from 14 g. (0.09 mole) of bromobenzene, 2.3 g. (0.1 mole) magnesium turnings, and 200 ml. of dry ether was added a solution of 10 g. (0.046 mole) of 2-phenacyl-1-methyl-piperidine in 100 ml. of dry ether. The mixture was refluxed 30 minutes, treated with a saturated solution of ammonium chloride, and extracted with 500 ml. of petroleum ether (40–60°). The extract was evaporated on the steam bath to a volume of 50 ml., cooled, and filtered; yield: 6 grams of white crystals of free base melting at 121–2°. A sample was converted to a hydrochloride. Part of the crude product when recrystallized from butanone-methanol melted at 218–220°. The other part of the crude hydrochloride when recrystallized from ethanol melted at 231–2°; when this was recrystallized from butanone-methanol, the melting point was 219–221°.

EXAMPLE II

*Alpha,alpha-diphenyl-beta-[4-(1-methylpiperidine)] ethanol*

Alpha,alpha-diphenyl-4-pyridine ethanol was obtained by the method of Tchitchibabine (Rec. trav. Chim. 57), 582 (1938)), using gamma-picoline. The hydrochloride melted at 263–4° dec. The free base from this hydrochloride (7. g.) in 50 ml. of methanol was heated at 75° in a closed container with 7 ml. of 57% methyl bromide in methanol for 5 days. The reaction mixture was diluted with 2 volumes of ethyl ether, cooled, and filtered to give white crystals of alpha,alpha-diphenyl-4-pyridine ethanol methobromide melting at 191–3°. A mixture of 8 g. (0.21 mole) of this methobromide, 0.5 g. platinum oxide catalyst, and 50 ml. of methanol was subjected to hydrogenation by shaking with hydrogen at room temperature with an initial hydrogen pressure of 60 pounds until the theoretical amount of hydrogen was absorbed. The mixture was then warmed on a steam bath, and the catalyst removed by filtration. The desired product as the hydrobromide was obtained as white crystals melting at 205–7° by cooling the filtrate.

EXAMPLE III

*Alpha,alpha-di-p-anisyl-beta-[2-(1-methylpiperidine)] ethanol*

Alpha,alpha - di - p - anisyl - beta - (2-pyridine)ethanol was prepared by the method of Tchitchibabine using alpha-picoline and di-p-anisyl ketone as starting materials. The product obtained had an M. P. of 111–112° C. and its hydrochloride an M. P. of 207–208°. This base was converted to the methobromide by heating at 75° in a closed container with an excess of methyl bromide in methanol for about 5 days as in Example II above. The product melted at 237–240°. Hydrogenation of this methobromide in methanol according to the procedure of Example II above gave the desired dianisyl 2-(1-methylpiperidine)ethanol hydrobromide, M. P. 202–204°.

EXAMPLE IV

*Alpha,alpha-diphenyl-beta-[2-(1-propylpiperidine)] ethanol*

A mixture of 6 g. (0.021 mole) of alpha,alpha-diphenyl-2-piperidine ethanol, 3 ml. propionaldehyde, and 50 ml. of methanol was refluxed till a complete solution resulted (15–30 minutes). About 0.5 g. platinum oxide was added and the mixture reduced. The mixture was filtered, the filtrate evaporated on the steam bath and the residue taken up in ether. Alcoholic HCl was added in slight excess; the mixture was cooled and filtered. The hydrochloride melted at 229–230°. The corresponding 1-ethyl compound is obtained by using acetaldehyde in place of propionaldehyde.

EXAMPLE V

*Alpha,alpha-diphenyl-beta-[2-(1,6-dimethylpiperidine)] ethanol*

Alpha,alpha - diphenyl - beta - [2 - (6 - methylpyridine)]

ethanol was prepared by the method of Tchitchibabine using 2,6-lutidine in place of alpha-picoline. The product melted at 122–124° and its hydrochloride at 220–222° C. This ethanol base was converted to the methobromide salt by the procedure of Example II. The methobromide obtained had an M. P. of 200–203° C. Hydrogenation of this methobromide by the method of Example II gave the hydrobromide of alpha,alpha-diphenyl-beta-[2-1,6-dimethylpiperidine)]ethanol, M. P. 174–176°. This product can exist in cis-trans forms. We have not attempted to distinguish between or separate these forms.

EXAMPLE VI

*Alpha-phenyl-alpha-p-chlorophenyl-beta-[2(1-methylpiperidine)]ethanol*

Alpha - phenyl - alpha - p - chlorophenyl - 2 - pyridine ethanol was obtained by the method of Tchitchibabine using 4-chlorobenzophenone in place of benzophenone. The base melted at 111–112° and the hydrochloride at 213–215° C. This base was converted to the methobromide salt by the procedure of Example II, M. P. 195–198° C. Hydrogenation of this methobromide by the method of Example II gave the desired alpha-phenyl-alpha-p-chlorophenyl-beta-[2-(1-methylpiperidine)]ethanol hydrobromide, M. P. 147–150° C. This product can exist as two racemic mixtures. We have not attempted to distinguish between or separate these sterioisomers.

EXAMPLE VII

*Alpha,alpha-di-p-tolyl-beta-[2-(1-methylpiperidine)]ethanol*

Alpha,alpha-di-p-tolyl-beta-(2-pyridine)ethanol was obtained by the method of Tchitchibabine using di-p-tolyl ketone in place of benzophenone. The hydrochloride had an M. P. of 193–195° C. (dec.) and the base an M. P. of 137–139° C. This base was converted to the methobromide by the procedure of Example II. The product melted at 281–283° C. (dec.). Hydrogenation of this methobromide by the procedure of Example II gave the desired di-p-tolyl 1-methylpiperidine ethanol as the hydrobromide salt, M. P. 177–180° C. Use of p-cumyl-phenyl ketone in place of di-tolyl ketone gives the corresponding alpha-p-cumyl-alpha-phenyl-beta[2-(1-methylpiperidine)]ethanol.

Thus, the invention includes compounds of the formula given above in which $R_2$ is an alkyl group having 1 to 3 carbon atoms and $R_3$ and $R_4$ are chosen from the group which includes phenyl, lower alkoxyphenyl, lower alkylphenyl and halophenyl, with the proviso that if one or both be alkylphenyl or alkoxyphenyl, the alkyl or alkoxy group contains not more than 3 carbon atoms, that is the total number of carbon atoms in the radical does not exceed 9.

We claim:
1. Compounds of the formula

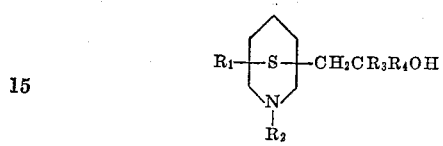

in which $R_1$ is selected from the group consisting of hydrogen and methyl, $R_2$ is an alkyl group having from 1 to 3 carbon atoms, $R_3$ is a radical selected from the group of phenyl, p-alkoxyphenyl, p-alkylphenyl, and p-chlorophenyl and $R_4$ is a radical selected from the group consisting of phenyl, p-alkoxyphenyl, p-alkylphenyl, and p-chlorophenyl, with the proviso that the number of carbon atoms in each of the radicals $R_3$ and $R_4$ does not exceed 9 and with the further proviso that the $CH_2CR_3R_4OH$ group is attached to the piperidine ring in one of the positions alpha and gamma.

2. Alpha,alpha-diphenyl-beta-[2-(1-methylpiperidine)]ethanol.

References Cited in the file of this patent

UNITED STATES PATENTS

| | | |
|---|---|---|
| 1,980,638 | Scheuing et al. | Nov. 13, 1934 |
| 2,624,739 | Werner et al. | Jan. 6, 1953 |
| 2,649,444 | Barrett | Aug. 18, 1953 |
| 2,680,115 | Ruddy | June 1, 1954 |

OTHER REFERENCES

Denton et al.: Jour. Am. Chem. Soc., vol. 71, pages 2050–56, Dec. 10, 1948.

Marvel et al.: J. A. C. S., vol. 51, pages 915–17 (1929).

Tilford et al.: J. A. C. S., vol. 70, pages 4001–9 (1948).